(12) United States Patent
Sugihara (10) Patent No.: US 6,954,409 B2
(45) Date of Patent: Oct. 11, 2005

(54) PING-PONG RECORDING METHOD AND MULTI-TRACK RECORDER APPARATUS

(75) Inventor: Masahiro Sugihara, Tokorozawa (JP)

(73) Assignee: TEAC Corporation, Tokyo (JP)

( * ) Notice: Subject to any disclaimer, the term of this patent is extended or adjusted under 35 U.S.C. 154(b) by 402 days.

(21) Appl. No.: 10/209,470

(22) Filed: Jul. 30, 2002

(65) Prior Publication Data

US 2003/0021049 A1 Jan. 30, 2003

(30) Foreign Application Priority Data

Jul. 30, 2001 (JP) ........................................ 2001-228975

(51) Int. Cl.[7] .............................................. G11B 20/10
(52) U.S. Cl. ................................ 369/47.13; 369/47.16; 369/47.27; 386/36; 386/98
(58) Field of Search ........................... 369/47.12, 47.13, 369/47.16; 386/39, 96, 98, 101, 104–106

(56) References Cited

U.S. PATENT DOCUMENTS 5,602,811 A * 2/1997 Ogusu et al. ............. 369/30.05
2002/0065570 A1 * 5/2002 Fujita et al. ................. 700/94

FOREIGN PATENT DOCUMENTS

JP          2001043604 A  *  2/2001  ........... G11B/19/04

* cited by examiner

*Primary Examiner*—David Hudspeth
*Assistant Examiner*—Dismery Mercedes
(74) *Attorney, Agent, or Firm*—Anderson Kill & Olick, PC; Eugene Lieberstein; Michael N. Meller

(57) ABSTRACT

A ping-pong recording method and apparatus is disclosed, which allows the mixing process to proceed while listening to the sounds for all of the parts.

The ping-pong recording apparatus includes a hard disk-based multi-track recorder means 10, a first mixer means 20, a second mixer means 30, and a master recorder means 40.

During the ping-pong recording process, the musical data for which the parts have finished the mixing may be saved in the saving area 12 that is provided in the multi-track recorder means 10. When the mixing is retried, it may be accomplished by moving the musical data that has been saved in the saving area 12 back to the appropriate tracks and reproducing the musical data from those tracks, and by reproducing other musical data for which the parts have finished the mixing.

13 Claims, 10 Drawing Sheets

PING-PONG RECORDING METHOD AND MULTI-TRACK RECORDER APPARATUS

TECHNICAL FIELD

The present invention relates principally to a multi-track recorder that is used for the multiplex recording of music. More particularly, the present invention relates to a ping-pong recording method and apparatus for recording musical signals composed of more number of musical parts than the number of tracks that are available on the multi-track recorder.

BACKGROUND OF THE INVENTION

The multiplex recording by the multi-track recorder is indispensable in the music production site. The sound of each musical instrument that together constitutes music may be recorded on respectively individual track, the volume balance of the sound of each musical instrument may be adjusted by the producer (such as mixing engineer) who considers the whole balance, and finally the two-channel stereophonic music may be produced (mixdown process).

During the mixing process, any audio effects, such as echo or reverb, chorus modulation and the like, may often be added as required to a particular sound signal, as is known in the art (effect process).

When music is multi-recorded, each players such as drum, bass, guitar, keyboard and the like may gather in the recording studio, and the sound played with band form may be recorded at a time as for multiplex recording. This technique, which is sometimes called the "one-time recording", may be used, but in many cases, the technique is used in which each sound of each player may be recorded separately.

In this technique, the recording may begin from a part of the music played by the first player that administers the rhythm of the music, and the sound of the next player who plays his instrument to the rhythm with listening to the sound already recorded may then be recorded.

For example, the recording may begin in the following sequence, the drum player who is assigned to produce the rhythm may first play his drum instrument, the sound of the drum may be recorded on the appropriate track of the multi-track recorder.

Then, the multi-track recorder may be operated so that the drum sound already recorded may be reproduced from the track. While the drum sound is being reproduced, another player, such as bass player (bassist), may play the bass instrument, the sound of the bass may be recorded on another track of the multi-track recorder.

Specifically, the bass player may perform his instrument to the rhythm by listening to the drum sound reproduced from the multi-track recorder.

Then, the next player, such as guitar player (guitarist), may play the guitar to the rhythm with listening to the bass sound reproduced from the multi-track recorder. The sound from the guitar player may be recorded on another track.

The above sequence may be repeated for each of the other instrument players, and the sound of each instrument player may be recorded on the appropriate track of the multi-track recorder.

When a musical work is produced by using the multi-track recorder as described above, there are some situations in which the number of tracks available on the multi-track recorder might not be sufficient to meet the sound sources from the possible instrument players involved. In such situations, there is a technique called as "ping-pong recording", which is well known in the art.

Figure 7:
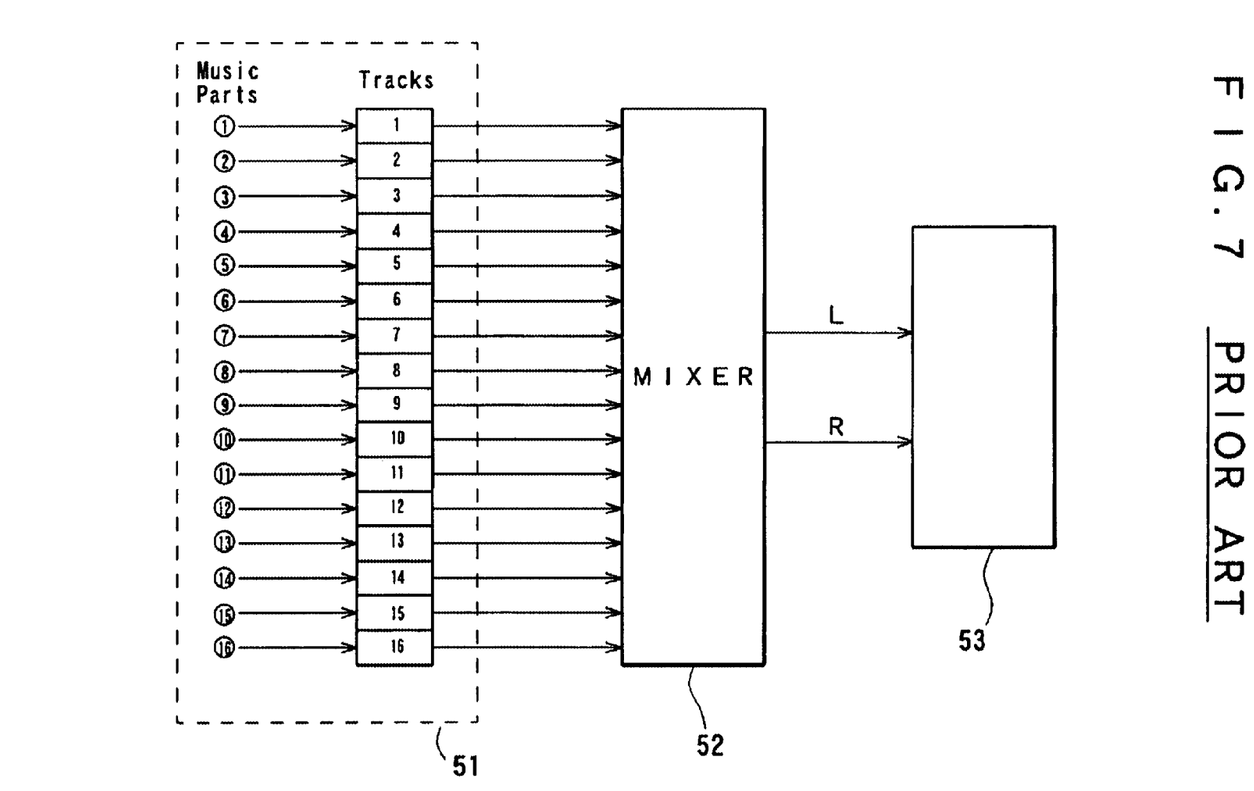
FIG. 7 is a block diagram illustrating the mixing device included in the prior art multi-track recorder.

Referring first to FIG. 7, the usual ping-pong recording process is described. In the following description, it is assumed that a musical work may be produced by using a 16-track magnetic tape-based multi-track recorder 51, a mixer 52 with 16 inputs and two channel outputs, and a 2-channel stereophonic master recorder 53.

When the number of the instrument (musical) parts that are involved in producing a particular musical work is less than 16, each of the instrument parts may first have a one-to-one correspondence with each of the tracks of the multi-track recorder, and the musical signal from each instrument part may then be recorded on the corresponding track. Next, those musical signals may be reproduced simultaneously, and may then be mixed by the mixer 52 into a 2-channel stereophonic signal that may be recorded on the master recorder 53. This process is called the mixdown process.

In this recording process, however, it is impossible to record the musical work that involves the instrument parts whose number is greater than the number of tracks available of the multi-track recorder.

This problem may be solved in two different ways.

The first solution is to operate several multi-track recorders synchronously with each other so that those multi-track recorders can record and reproduce the musical parts of and from their respective tracks concurrently. In this way, the number of tracks that are physically available may be increased.

The other solution is called the ping-pong recording process, which is described below.

In the ping-pong recording process, when a musical signal that contains more musical parts than the tracks available of the multi-track recorder is recorded on those tracks, some of the musical parts that require a fewer tracks may first be recorded on those tracks, for which the mixdown may then occur. The musical parts for which the mixdown have occurred may then be recorded on any free tracks, and each of the remaining musical parts may be recorded on each of the tracks on which the musical parts for which the mixdown occurred had been recorded and which are now freed. Finally, the musical signal containing all of the musical parts thus recorded on the tracks may be mixed.

Figure 8:
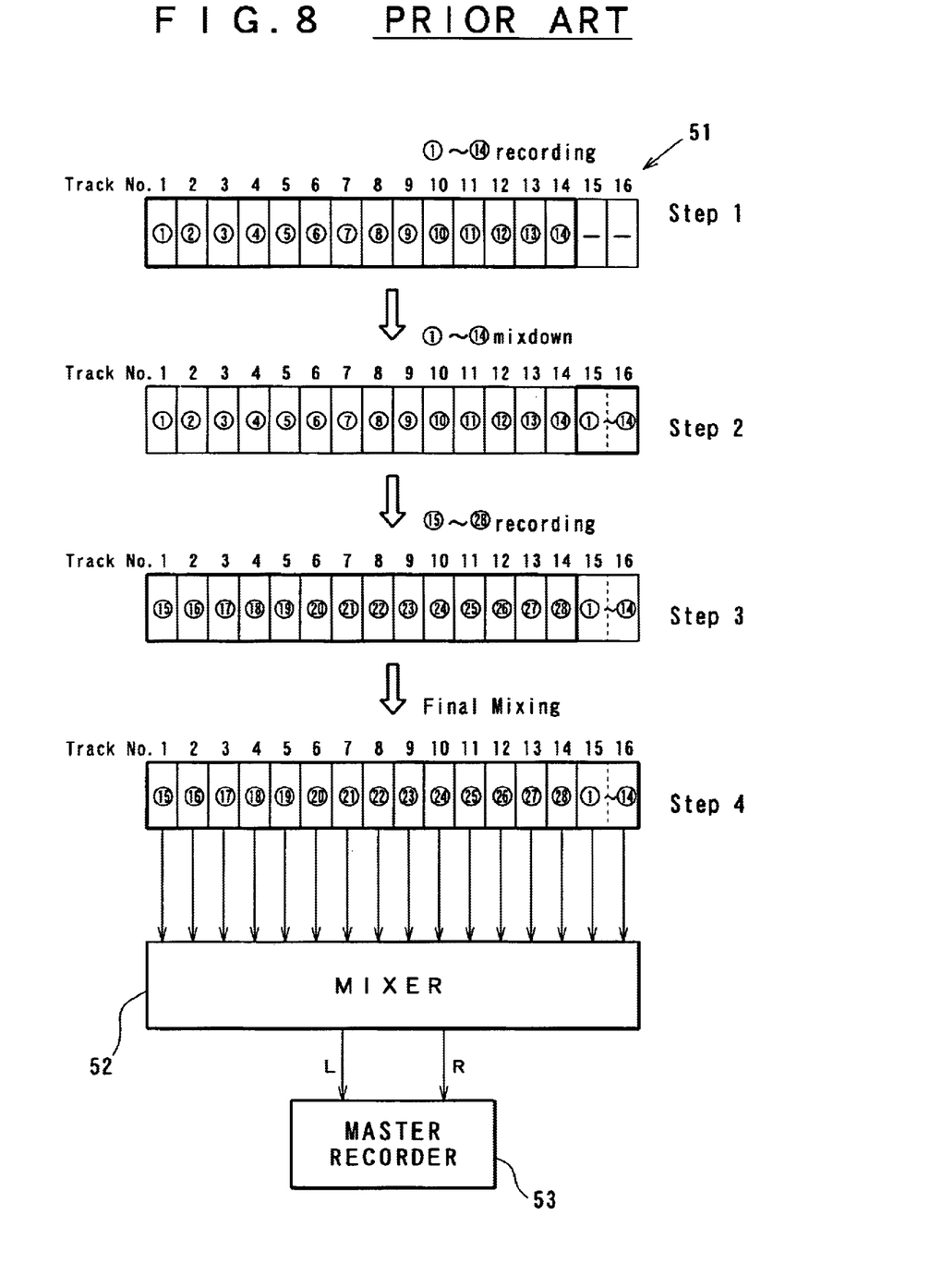
FIG. 8 is a flowchart of the procedure implemented by the prior art ping-pong recording method.

To provide an easy understanding of the ping-pong recording process, an example is shown in FIG. 8. In the recording sequence shown in FIG. 8, a 16-track multi-track recorder 51 is used to record more than 17 instrument parts (28 instrument parts in this example). The recording sequence may occur in the following steps.

(Step 1)

The instrument parts 1–14 may be recorded on their corresponding tracks 1–14 on the multi-track recorder separately. The tracks 15 and 16 are free tracks.

(Step 2)

The instrument parts 1–14 recorded at Step 1 may be reproduced, for which the mixdown may occur. Then, the parts, for which mixdown occurred, may be recorded on the tracks 15 and 16.

(Step 3)

The musical signal, which corresponds to the instrument parts 1–14 that remain on the tracks 1–14, may be erased, and the other instrument parts 15–28 may be recorded on the tracks 1–14 that are now freed.

(Step 4)

The instrument parts 1–14 that have been mixed and recorded on the tracks 15, 16 and the instrument parts 15–28 that have been recorded on the tracks 1–14, respectively, may be reproduced concurrently, which may be passed through the mixer 52 where provides mixdown outputs for those parts. The result is the 2-channel musical signal that may be recorded on the master recorder 53.

The 28-part musical signal may now be ready for the mixing by the 16-track multi-track recorder.

There is also a multi-track recorder that employs the hard disk as the recording medium. In the hard disk-type multi-track recorder, audio waves may be converted into corresponding digital data forms, which may be stored as a file on the hard disk. As long as any extra space is available on the hard disk, any existing data may reside there, rather than being erased, whenever new data is stored. When the ping-pong recording process occurs using the hard disk-type multi-track recorder, therefore, each file that contains the parts 1–14 recorded on the respective tracks may have been saved in the saving area other than those tracks, before proceeding to Step 3 described above. Then, the mixing may be retried for those files at a later time.

Figure 9:
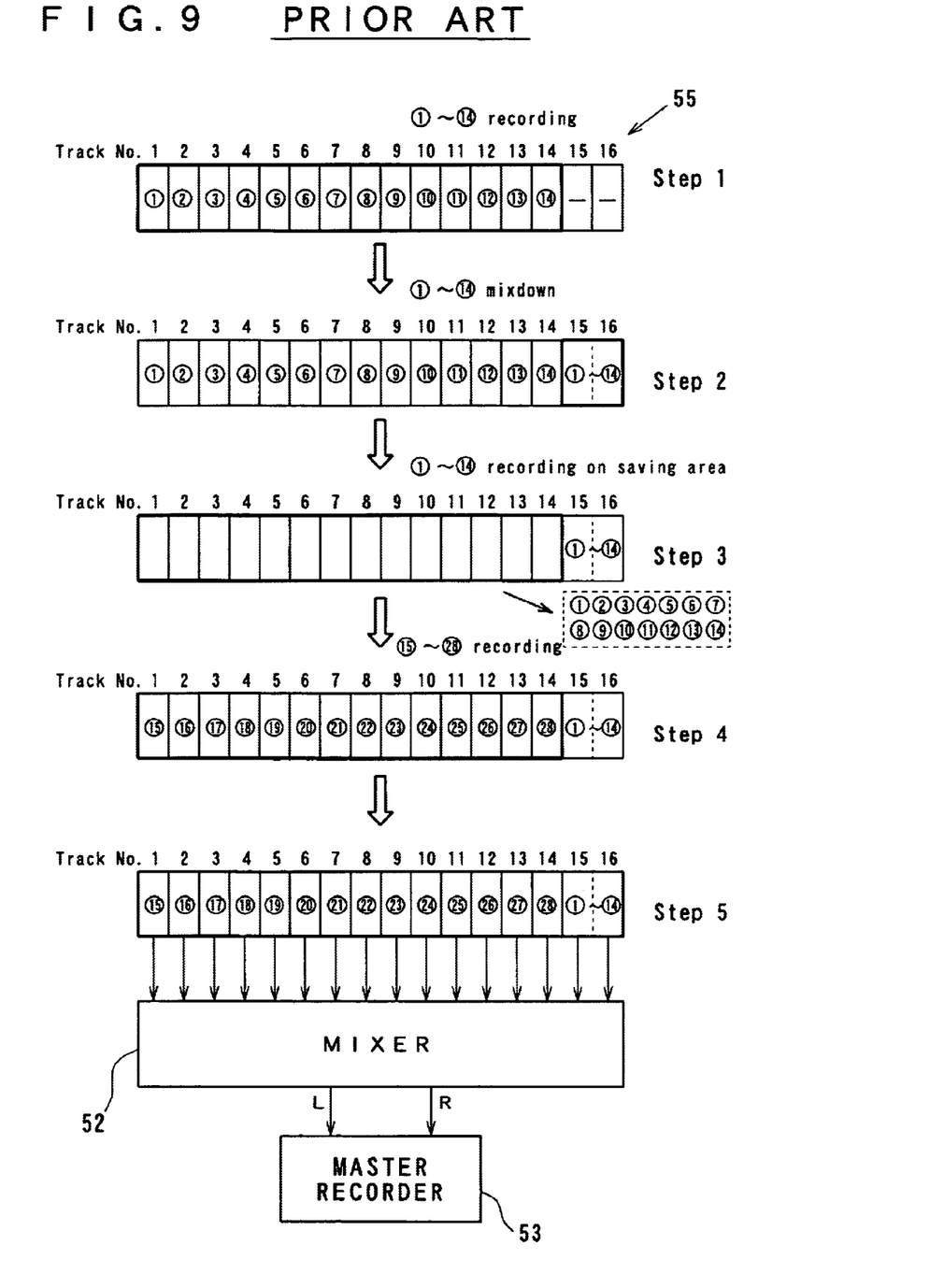
FIG. 9 is a flowchart of the procedure implemented by the prior art ping-pong recording method using the hard disk-type multi-track recorder.
Figure 10:
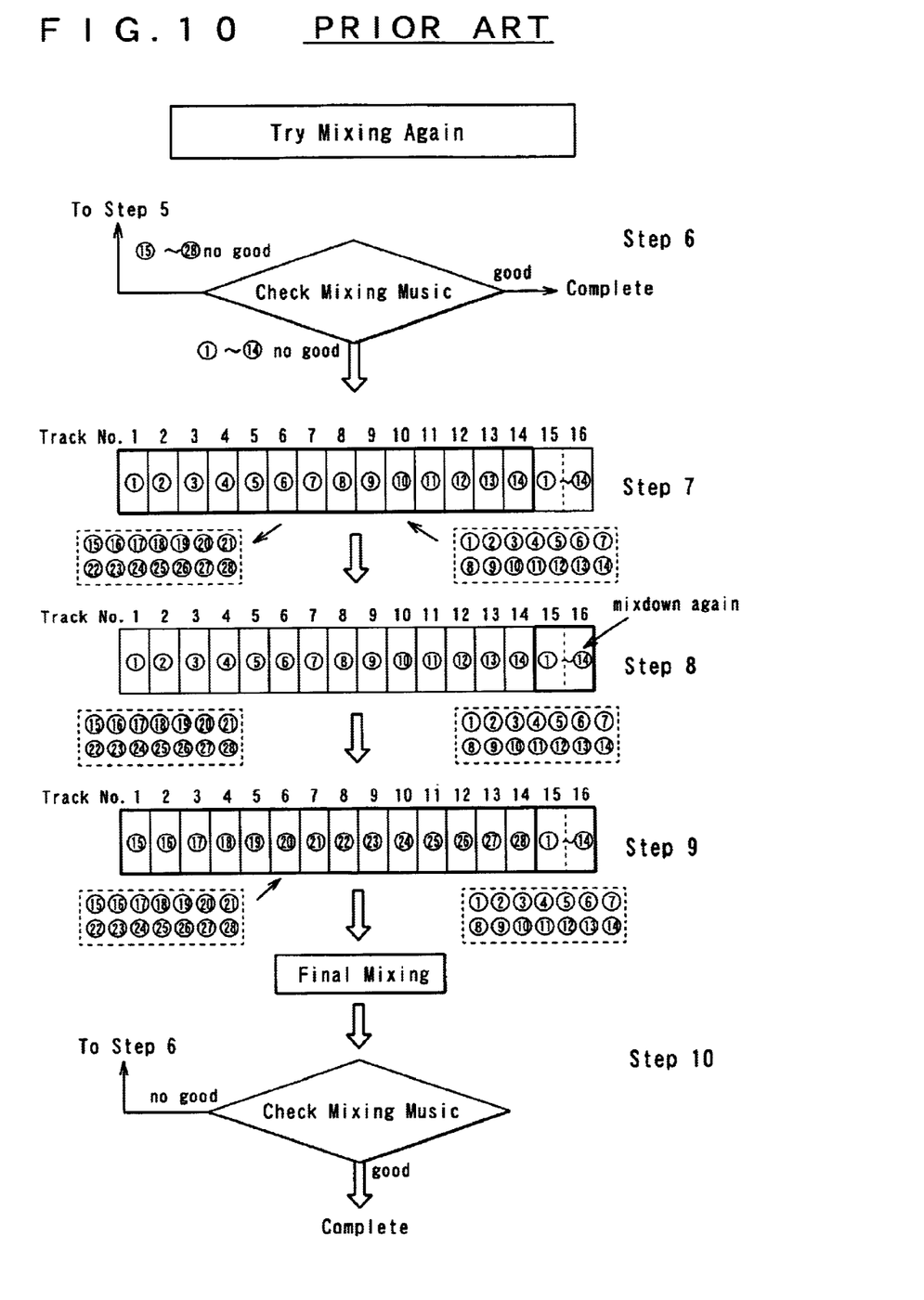
FIG. 10 is also a flowchart of the procedure implemented by the prior art ping-pong recording method.

The following is the ping-pong recording sequence that occurs on the instrument parts involving 28 parts, by using the hard disk-type multi-track recorder 55. Referring now to FIGS. 9 and 10, this sequence is described below step-by-step.

(Step 1)

The parts 1–14 may be recorded on the corresponding tracks 1–14 separately. The tracks 15 and 16 are free tracks.

(Step 2)

The tracks 1–14 may be reproduced concurrently, for which the mixdown may occur. The parts for which the mixdown have completed may be recorded on the free tracks 15 and 16.

(Step 3)

The musical data for the parts 1–14 that have been recorded on the tracks 1–14 at Step 1 may be saved in the saving area in the hard disk, and the tracks 1–14 may then be reset to blanks so that subsequent musical parts or associated data can be recorded on those tracks.

(Step 4)

The parts 15–28 may be recorded on the corresponding tracks 1–14 separately.

(Step 5)

The tracks 15 and 16 on which the parts 1–14 for which the mixdown has completed, are recorded, and the tracks 1–14 on which the parts 15–28 are recorded may be reproduced concurrently, all of which may be mixed into a 2-channel stereophonic music that may be fed to the master recorder 53 where the mixdown may occur for them. For now, the musical work may be completed, although it may not be perfect.

(Step 6)

The master recorder 53 may be operated to replay the musical work completed at Step 5. The musical work may be checked that the mixing is perfect by listening to the 2-channel stereophonic music. If it is found that the parts 15–28 have the mixing balance problem, Step 5 may be repeated, where the mixdown may be retried. If it is found that the parts 1–14 have the mixing balance problem, proceed to Step 7.

(Step 7)

The musical data for which the parts 15–28 have been recorded on the tracks 1–14 may be saved in the saving area on the hard disk, and the musical data for which the parts 1–14 have been saved in the saving area at Step 3 may be loaded onto the tracks 1–14.

(Step 8)

The musical data on the tracks 15 and 16 may be discarded so that they can be reused for recording, while at the same time the tracks 1–14 may be reproduced, for which the mixdown may be retried. The result may be recorded on the tracks 15 and 16.

(Step 9)

The musical data for which the parts 15–28 have been saved in the saving area at Step 7 may be loaded onto the tracks 1–14, and Step 5 may be repeated, where the final mixing may be retried.

(Step 10)

The master recorder may be operated to replay the musical work. The musical work may be checked that mixing is perfect by replaying the 2-channel stereophonic music. If it is found that the mixing has no problem, no further actions are required. If it is found that the mixing is not perfect, Step 6 may be repeated.

The ping-pong recording process performed by the multi-track recorder using the magnetic tape as the recording medium, or the ping-pong recording process performed by the multi-track recorder using the hard disk as the recording medium as described above have the following problems, respectively.

For the ping-pong recording performed by the magnetic tape-based multi-track recorder (regardless of whether it is the digital recording or analog recording), before the parts 15–28 can be recorded at Step 3, the parts 1–14 that are now recorded must been erased. When the musical work temporarily recorded on the master recorder is reproduced for listening after Step 4 is done, it may be found that the mixing balance obtained at Step 2 is imperfect. In this case, it would not be impossible to perform the mixing again.

For the ping-pong recording performed by the hard disk-based multi-track recorder, it is impossible to hear the sound for the parts 15–28 while the mixdown is going on for the parts 1–14 at Step 2 and Step 8. Thus, the mixdown for the parts 1–14 must occur by imagining the sound provided by the parts 15–28 which are to be added later. It is natural that the sounds for the parts 15–28 cannot be heard, since those parts have not already been recorded at the time of Step 2. Nevertheless, this happens even when the parts 15–28 have been recorded at Step 8, and the musical data files have been saved on the hard disk.

According to the ping-pong recording process just described above, the sounds for the parts 15–28 cannot be reproduced for listening at Step 2, and therefore the mixing for the parts 1–14 must be carried out by imagining the sounds for the parts 15–28. Then, if the mixing balance problem is found at Step 6, the mixdown must be retried at Step 8. If the sounds for the parts 15–28 cannot still be heard after the mixdown is retried at Step 8, the same errors might be repeated.

In any of the conventional ping-pong recording techniques described above, the mixing process cannot proceed while listening to all the parts recorded on the tracks. Thus, the personal imagination and experience are required when the mixdown process occurs. Even the experienced mixing engineer might have the risk of repeating the mixdown process each time it should fail. To avoid such risk, the ping-pong recording process must be abandoned, and an alternative recording process must be relied upon. To implement such recording process, the multi-track recorder must provide more tracks, and the mixer must provide more inputs. This may increase the cost of the audio equipment that is installed in the studio.

The present invention is based on the observation of the problems associated with the prior art as described above, and provides a ping-pong recording method and apparatus that allows the mixing process to proceed while listening to the recorded sounds for all of the instrument parts involved.

SUMMARY OF THE INVENTION

In order to solve the above problems, the present invention provides several aspects of the ping-pong recording method. According to one aspect of the present invention as defined in claim 1, the ping-pong recording method is provided for use in conjunction with a multi-track recorder apparatus including a randomly accessible storage medium, wherein the method comprises the steps of:

(a) dividing multiple tracks on the randomly accessible storage medium on the multi-track recorder apparatus into:
  (i) musical part recording tracks
  (ii) at least two or more groups of mixdown recording tracks;
(b) recording a group of musical signals on each of said musical part recording tracks, and storing said group of musical signals in a saving area on said storage medium so that they can be reproduced at a later time;
(c) reproducing said musical part recording tracks on which the groups of the musical signals have been recorded in the step (b), and recording the musical signals for which the mixdown have occurred on one of said at least two or more groups of mixdown recording tracks;
(d) for each group of musical signals that are different from the preceding group of musical signals already recorded on the appropriate musical part recording tracks, repeating the steps (b) and (c); and
(e) reading the groups of musical signals from said saving area as required, and loading said groups of musical signals onto said musical part recording tracks so that they can be reproduced at a later time.

According to another aspect of the present invention as defined in claim 2, the ping-pong recording method is provided, wherein the groups of musical signals that are read from said saving area, and are loaded onto said musical part recording tracks so that they can be reproduced includes any musical signals optionally selected from two or more groups of musical signals stored in said saving area.

According to a further aspect of the present invention as defined in claim 3 or 4, the ping-pong recording method is provided, wherein said saving area is allocated on said randomly accessible storage medium for storing:
(i) said musical signals corresponding to one of said musical part recording tracks and
(ii) the track editing information associated with said one of said musical part recording tracks, wherein both said musical signals and said track editing information may be read from said saving area as required.

The present invention also provides several aspects of the multi-track recorder apparatus. According to one aspect of the present invention as defined in claim 5, the multi-track recorder apparatus is provided, wherein the apparatus comprises:

(a) a multi-track recorder means, said multi-track recorder means including a randomly accessible storage medium on which multiple tracks are allocated so that the recording and reproducing can occur on said multiple tracks, wherein the existing data already recorded on each of said multiple tracks may be replaced by any other data;
(b) a first mixer means coupled to said multi-track recorder means and operative to mix the reproduced signals recorded on said multiple tracks on said multi-track recorder means; and (c) a second mixer means coupled to said multi-track recorder means and to said first mixer means and operative to mix the output signals from said multi-track recorder means that represent the rest of the reproduced signals that is not delivered to the input of said first mixer means from said multi-track recorder means, together with the output signals from said first mixer means.

According to another aspect of the present invention as defined in claim 6, the multi-track recorder apparatus is provided, wherein the output signals from said first mixer means can be entered into said track regions.

According to a further aspect of the present invention as defined in claim 7 or 8, the multi-track recorder apparatus is provided, wherein the input of said first mixer means is coupled to those of said tracks that are reserved for recording the musical parts, and one of the inputs of said second mixer means is coupled to those of said tracks that are reserved for recording two or more groups of mixdown recording tracks, each of said two or more groups including 2 or more tracks.

According to still another aspect of the present invention as defined in any claims of 9 through 12, the multi-track recorder apparatus is provided, wherein the apparatus further includes a connection control means that enables said multi-track recorder means selectively to be switched to said first mixer means or to said second mixer means.

According to a further aspect of the present invention as defined in claim 13, the multi-track recorder apparatus is provided, wherein the apparatus comprises:

(a) a multi-track recorder means, said multi-track recorder means including a randomly accessible storage medium on which multiple tracks are allocated so that the recording and reproducing can occur on said multiple tracks, wherein the existing data already recorded on each of said multiple tracks may be replaced by any other data;
(b) a first mixer means coupled to said multi-track recorder means and operative to mix the reproduced signals on said multiple tracks on said multi-track recorder means;
(c) a second mixer means coupled to said multi-track recorder means and to said first mixer means and operative to mix the output signals from said multi-track recorder means that represent the rest of the reproduced signals that is not delivered to the input of said first mixer means from said multi-track recorder means, together with the output signals from said first mixer means; and
(d) a control means that enables the data already recorded on each of said multiple tracks to be replaced by any other data, and controls the signal paths of the input and output signals exchanged between said multi-track recorder means, said first mixer means and said second mixer means.

More specifically, according to the aspect of the present invention as defined in claim 1, some of the tracks that are available on the multi-track recorder are allocated as the mixdown recording tracks, each corresponding to each group of musical parts, so that the musical signals for which the mixdown has occurred may be reproduced for each group of musical parts at any time. The musical signals for the mixdown may be saved in the saving area on the storage medium. Those musical signals may be read from the saving area back to the tracks, and may be reproduced. When the mixing should be retried, those of the musical signals that have been saved in the saving area and correspond to the group of musical parts that needs the re-mixing may be retrieved from the saving area and moved back to the corresponding musical part recording tracks. The musical signals thus moved back to the tracks, as well as the musical signals that correspond to other groups of musical parts and have been recorded on the mixdown recording tracks may be reproduced. Then, the final mixing may proceed by editing those reproduced musical signals, such as for adjusting the volume, processing the audio effects, etc. In other words, the re-mixing may be performed by using the musical signals corresponding to the musical parts that have already finished the mixing, and this may occur while those musical signals are being reproduced. This ensures that the mixing can occur without errors.

Although the particular number of tracks that are available on the multi-track recorder has been shown and described, the present invention is not limited to any particular number of tracks. For the production of any 2-channel stereophonic musical work, for example, the number of tracks may be 9 or more tracks, which should provide more effective results. The multi-track recorder may include the randomly accessible storage medium, and the tracks that are available on the storage medium may be divided into the musical part recording track region, the mixdown recording track region, and the track region for recording the musical signals for the groups of musical parts for which the mixdown has finished. Thus, the storage medium should have the memory capacity to accommodate those regions. The storage medium may be used alone, and may have a saving area allocated for storing the musical signals for which the mixdown has completed. In this case, the storage medium should have the additional memory space for the saving area. Here, the saving area is the area that may reside independently of the above track regions, and can hold the particular musical signals, regardless of whether they have been recorded on the track regions or not. The track regions and the saving area have addresses assigned, respectively, which may not have to be physically fixed, but may be logically variable. In addition to the above storage medium, another storage medium may be provided, on which the saving area may be provided.

Typically, the storage medium may include the hard disk, but the present invention is not limited to any particular type of storage medium, such as hard disk. Rather, the present invention may employ any type of storage medium, such as ZIP, MD, CD-RW, DVD, MO, RAM and flush memory.

If the number of the parts for which the musical signals are being recorded on the appropriate track regions on the multi-track recorder should exceed the number of tracks available, those musical signals would be divided into several groups of musical signals, and the processing as described above would occur for each group of musical signals. The number of groups into which the musical signals are divided may be determined by the total number of musical parts and the total number of tracks available, respectively. Normally, the musical signals are divided into two groups. In this case, two groups of mixdown recording tracks should be reserved for the two groups of musical signals. When the musical signals are divided into three groups, three groups of mixdown recording tracks should be reserved for the three groups of musical signals. When the musical signals for which the mixdown has completed are the right and left 2-channel musical signals, 2 tracks will be used for each channel, so that the signals for which the mixdown has completed can be recorded there. The musical signals are normally more than two channel musical signals, and therefore one group of mixdown recording tracks consists of more than two tracks.

When the mixing is retried, the musical signals that reside on the storage area may be moved from the storage area back to the corresponding tracks, from which the musical signals may be reproduced. Additionally, the mixdown may occur for those musical signals, which may then be recorded on the mixdown recording tracks. In this case, the musical signals may override the musical signals for which the mixdown has completed and that exist on the same tracks. In other words, the new musical signals may overwrite the old musical signals, or the old musical signals may be erased from the tracks, so that the new musical signals may be recorded there. The final mixing may proceed by reproducing the new musical signals for which the mixdown has finished, together with other parts for which the musical signals have been moved from the saving area back to the corresponding tracks.

According to the aspect of the present invention as defined in claim 2, the mixing may be retried for a particular group of musical signals by varying its combination. More specifically, any desired combination of musical signals may be selected from the musical signals that are stored on the saving area, and may then be moved back to the corresponding tracks. If the existing musical signals on the tracks, for which the mixdown has completed, do not correspond to the new combination of musical signals, the mixdown may be retried for the musical signals moved back to the tracks, and they may then be recorded on the mixdown recording tracks. Considering the group of musical signals for which the mixdown has just finished, other groups of musical signals may be restored from the saving area, and then may be moved back to the mixdown recording tracks. The final mixing may proceed by repeating the above sequence one or more times (one time for two groups of musical signals, and two or more times for more than two groups of musical signals).

When the mixdown is tried for a particular group of musical signals, the operator may edit the musical signals, including the audio effects such as fading, echoing, right and left balancing. According to the aspect of the present invention as defined in claim 3 or 4, this information may be stored in the saving area together with the associated musical parts that are also stored in the saving area so that it can be retrieved at a later time. As this information such as the audio effect information may be retrieved from the saving area for reproduction, at the same that the associated musical parts are retrieved, the editor may be relieved of the burden of performing the editing activities at the time when the mixing is retried.

The ping-pong recording method that has been described so far may be implemented by the multi-track recorder apparatus as defined in claim 5. When the mixing is retried, the apparatus may be operated in accordance with the method steps so that it can reproduce the musical signals for which the mixdown has completed, together with the musical signals for the associated musical parts. In this way, the editor can perform the final mixing activities by using the apparatus.

The multi-track recorder apparatus includes a randomly accessible storage media on which a plurality of track regions may be allocated. The existing data that resides on each track may be rewritten by any other data. More specifically, a particular musical data including several musical parts may be recorded on the corresponding track region, from which the musical data may be retrieved, and the mixdown may be tried for those musical data. The musical data for which the mixdown has completed may be moved to another track reserved for such musical data, where this musical data may be replaced by any other musical data as required.

This replacement may be performed by using a saving area that is reserved separately from the track regions, for example. Specifically, the musical data on the track region may be moved to the saving area, from which the musical data may be moved back to the track region when the replacement occurs.

The saving area may be provided on the same storage medium on which the track regions are allocated, or may be provided on a different storage medium.

The storage medium may include the hard disk and other media listed earlier. Typically, the multi-track recorder apparatus includes a multi-track recorder means, wherein the multi-track recorder means includes A/D (analog-to-digital) converter that converts the input analog musical signals into the corresponding digital forms, D/A (digital-to-analog) converter that converts the input digital signals into the corresponding analog forms, DSP (digital signal processor) that processes the digital signals and provides output, and the like. The signal processing may occur, depending on the particular number of tracks. The multi-track recorder means may allocate the track regions and the saving area on the storage medium (or possibly on different storage media), and may perform the movement of the musical signals to and from the track regions and the saving area, respectively. Those operations may be performed under control of software.

The apparatus further includes a first mixer means that performs the mixing for the musical signals that have been reproduced from the tracks on the multi-track recorder means. This mixer means provides the functions for balancing several musical signals and combining the musical signals into a collection of signals, as is known in the art. One example of the collection of signals is the right and left 2-channel stereophonic signals. The first mixer means allows the editor to perform the editing operations for each musical part, such as the fading operation and audio effect operation. Normally, the musical signals for which the mixdown has completed may be provided through the editing operations including the fading and audio effect operations.

The input of the first mixer means is coupled to the reproduced signals from the multi-track recorder means. Normally, the first mixer means is coupled to the musical part recording tracks, from which the reproduced signals are fed to the first mixer means. The output of the first mixer means is coupled to one input of a second mixer means that is described later. At the second mixer means, the mixdown may occur for the output of the first mixer means as well as the musical signals that are fed to the second mixer means through the other input of the second mixer means.

According to the aspect of the present invention as defined in claim 6, the output of the first mixer means may be coupled to the tracks on the storage medium. Thus, the musical signals for which the mixdown has completed at the first mixer means may be recorded on the mixdown recording tracks on the storage medium. The mixdown recording tracks are previously reserved for each group of musical parts that are expected to occur. Thus, the musical signals for which the mixdown has completed and that have already been recorded, as well as the musical signals that reside on the musical part recording tracks, may be copied to other tracks without loss which arises by erasing etc.

The apparatus further includes the second mixer means mentioned above. The reproduced signals from the tracks on the multi-track recorder means, as well as the output signals of the first mixer means may be fed to the second mixer means, where the mixdown may occur for those signals. The second mixer means has two stereophonic inputs, and may simply perform the mixing operation on those inputs at the ratio of 1 to 1. Thus, there are no fading means and echoing means at the inputs of the second mixer means. A fading means is only provided at the output of the second mixer means, for adjusting the signal level that is passed to a master recorder means to be described later.

The second mixer means may perform the mixing operations on the reproduced signals from the tracks on the multi-track recorder means as well as the output signals from the first mixer means, and may provide the output to the master recorder means that will be described in detail later.

The input of the second mixer means is normally coupled to the mixdown recording tracks, and the reproduced signals from the tracks may be fed to the second mixer means through its input.

The first mixer means and the second mixer means have been described as separate devices, but they may be integrated into a mixer apparatus in which they may be operated separately under control of the software.

According to the aspect of the present invention as defined in any claims of 9 through 12, the connections between the first mixer means and second mixer means may be switched by a connection control means so that the input and output operations can occur between them. This switching may be controlled by the connection control means in accordance with the steps implemented by the software program.

The musical signals that have been mixed at the second mixer means are fed to the master recorder where the musical signals are recorded on the tracks. The recording method and/or recording medium that may be employed by the master recorder means are not limited to any particular recording method and/or recording medium. The musical signals may be stored so that they can be accessed sequentially or randomly. The master recorder means may share the storage medium with the multi-track recorder means.

DETAILED DESCRIPTION OF THE INVENTION

Referring to FIGS. 1 through 6, several particular embodiments of the present invention will now be described in further detail.

Figure 1:
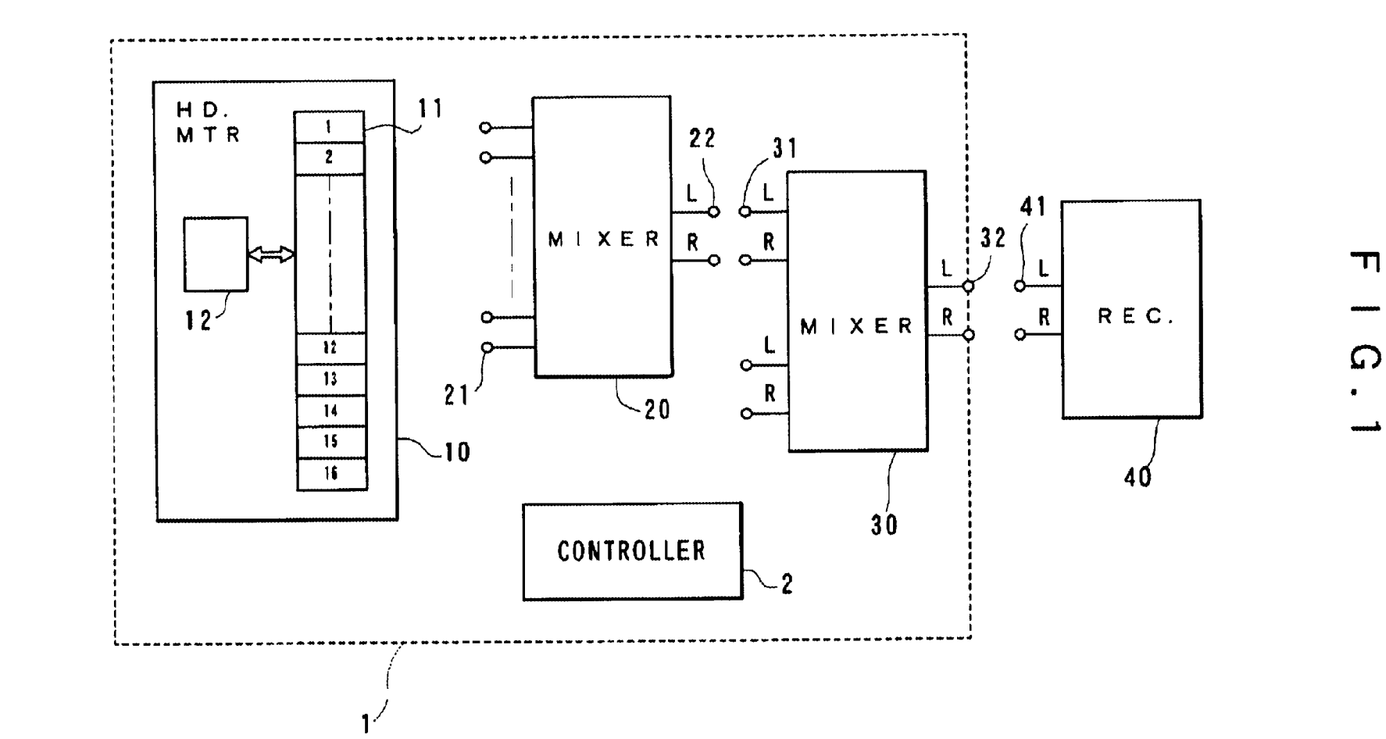
FIG. 1 is a block diagram illustrating the configuration of the ping-pong recording apparatus in accordance with one embodiment of the present invention.

FIG. 1 is a block diagram illustrating the configuration of the ping-pong recording apparatus according to one embodiment of the present invention. As shown in FIG. 1, the apparatus includes a hard disk-type multi-track recorder means (HD.MTR) 10 having a randomly accessible storage medium in the form of the hard disk installed, a first mixer means 20, a second mixer means 30, and a master recorder means 40. The multi-track recorder means 10, the first mixer means 20 and the second mixer means 30 are integrated into a single unit that is shown as enclosed by the dashed lines in FIG. 1, and the connections between each means may be controlled by a controller 2 that is also included in the unit. The connection control may be performed for each of the steps that are described below specifically.

The multi-track recorder apparatus includes the hard disk as the storage medium, and accepts, as input, digital audio signals from any external source that have been converted from analog into digital forms. The digital audio signals are then fed to DSP (digital signal processor) that performs the operations on the signals, such as adjusting the volume, equalizing, etc. The output of DSP may be stored in the hard disk.

The digital audio signals may be maintained as a digital audio data file on the hard disk.

At the same time, the digital audio data file may be read by DSP, which reproduces the file as the digital audio data and converts the data from digital into analog forms. The output of DSP is provided as audio signals that are delivered to any external device.

The multi-track recorder apparatus operates in the same manner as the prior art multi-track recorder apparatus using the magnetic tape, but the number of tracks that can be provided by the multi-track recorder apparatus may depend upon the processing capability of DSP, that is, the number of digital audio data channels that DSP is capable of handling at the same time.

Accordingly, the block diagram in FIG. 1 is assumed to represent the functions of the multi-track recorder apparatus.

The multi-track recorder apparatus may be said to be a computer that provides the functions of DSP combined with the hard disk.

It should be understood that the functions of the multi-track recorder apparatus may be implemented as an application program that runs on any well-known operating system (OS) that is installed on any well-known personal computer (PC).

In the following description, it is assumed that the processing capability of DSP is restricted to 16 tracks that can be reproduced at the same time.

Accordingly, it is assumed that 16 tracks 11 and a saving area 12 are provided on the multi-track recorder means 10, and data may be exchanged between the tracks 11 and the saving area 12.

The first mixer means 20 has a number of input lines 21 (12 inputs in this case) and one set of stereophonic output lines 22. The second mixer means 30 has several sets of stereophonic input lines 31 (two sets in this case) and one set of stereophonic output lines 32.

The master recorder means 40 (REC.) has one set of stereophonic input lines 41. This recorder means may be implemented as an analog or digital tape format or disk format.

(Embodiment 1)

Referring now to FIGS. 2 through 6 that show the respective connections between the various functional elements configured in the ping-pong recording apparatus described so far, one example of the ping-pong recording method of the present invention is described. The procedure implemented by the example is shown as the flowchart of FIG. 5 and FIG. 6 respectively. In the following, the mixing sequence is described step by step, in connection with the musical signals each corresponding to each of the musical parts 1–24 (the numbers are shown as circled in the figures).

(Step 1)

Figure 5:
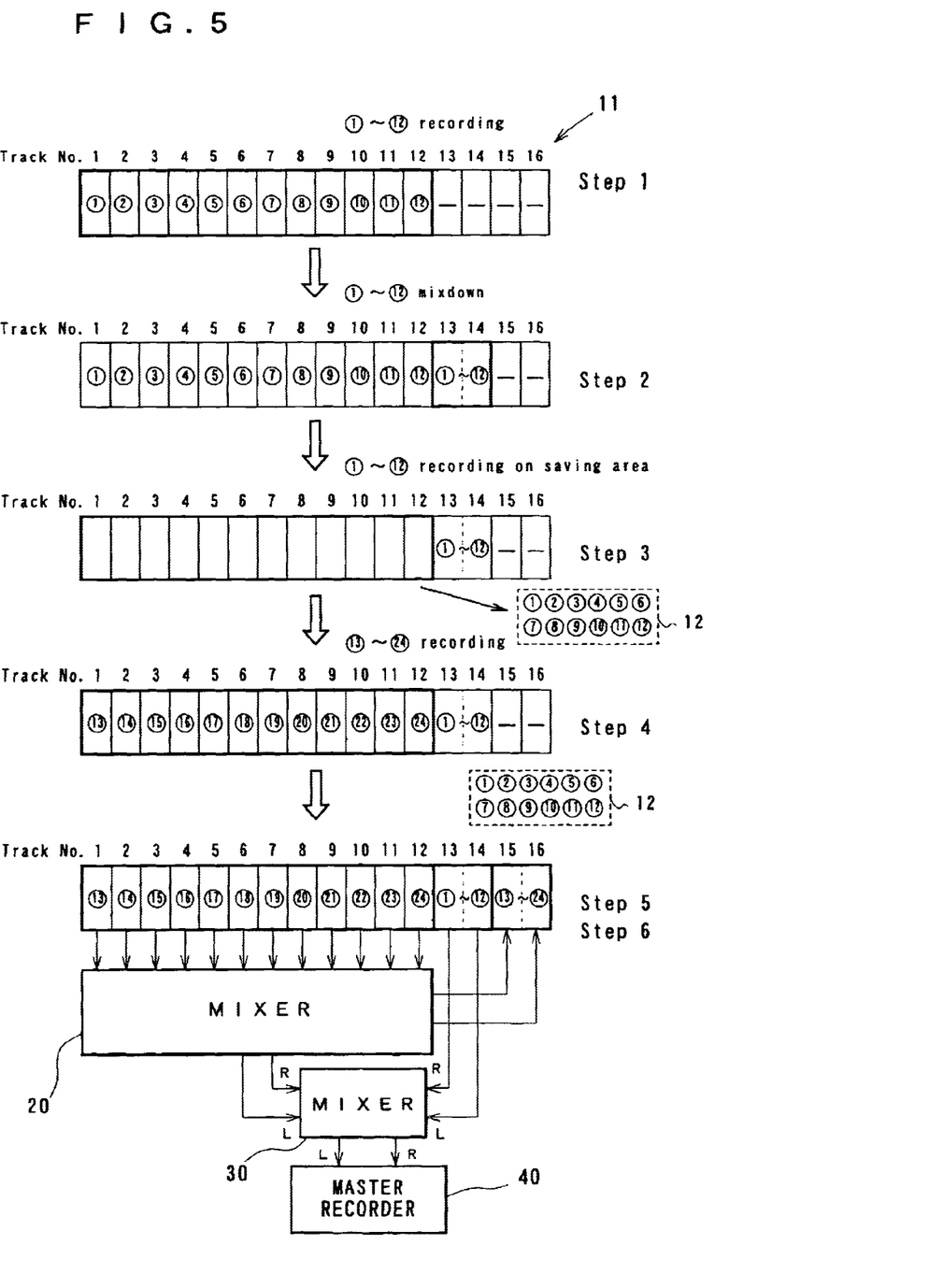
FIG. 5 is a flowchart of the procedure implemented by the ping-pong recording method in accordance with one embodiment of the present invention.

The musical parts 1–12 that correspond to some of the musical signals may be recorded on the corresponding tracks 1–12 on the multi-track recorder means 10, respectively. Note that the tracks are generally represented by 11, but are identified by their respective numbers when referred to specifically.

(Step 2)

Figure 2:
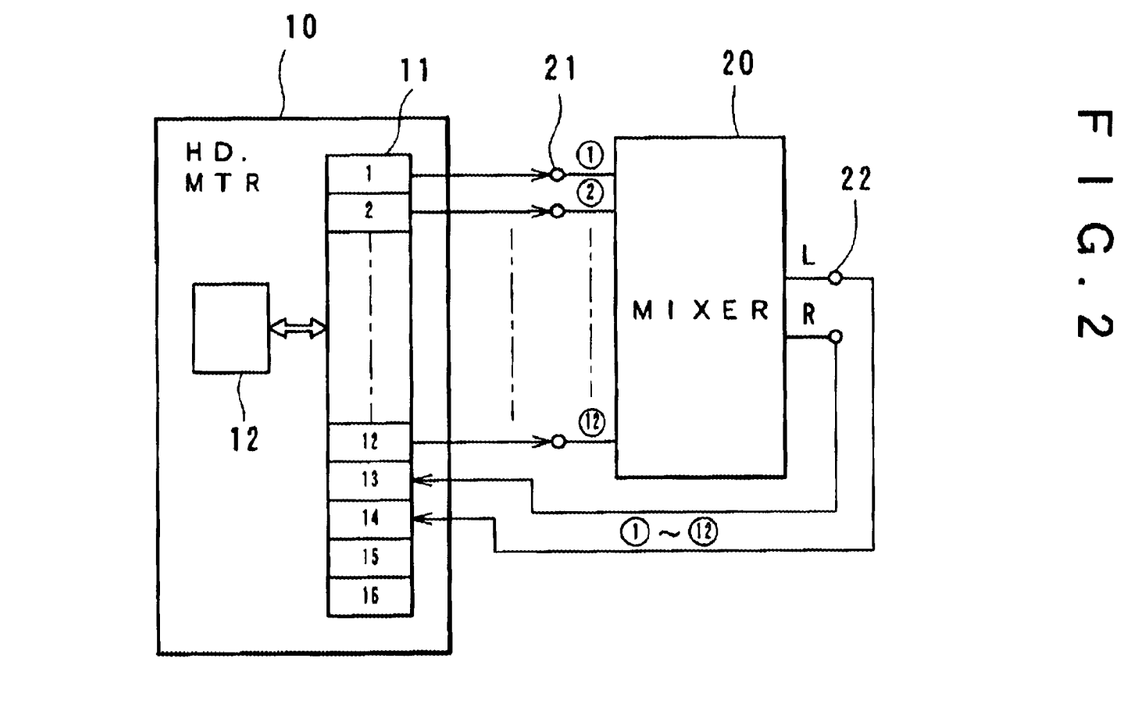
FIG. 2 represents the connections that are established when Step 2 is performed in the ping-pong recording method according to one embodiment of the present invention.

With the tracks 1–12 on the multi-track recorder means 10 being connected to the corresponding input lines 21 on the first mixer means 20 as shown in FIG. 2, the musical signals on the track 1–12 may be reproduced concurrently, and the mixdown may then occur for the reproduced musical signals. The musical signals for which the mixdown has completed may be recorded on the tracks 13 and 14.

(Step 3)

The musical signals for which the parts 1–12 have been recorded on the tracks 1–12 may be saved as a file in the saving area 12, while the tracks 1–12 may be reset to blanks so that those tracks can be reused for any further recording.

(Step 4)

The musical parts 13–14 that correspond to the remaining musical signals may be recorded on the tracks 1–12 that have been freed at Step 3.

(Step 5)

Figure 3:
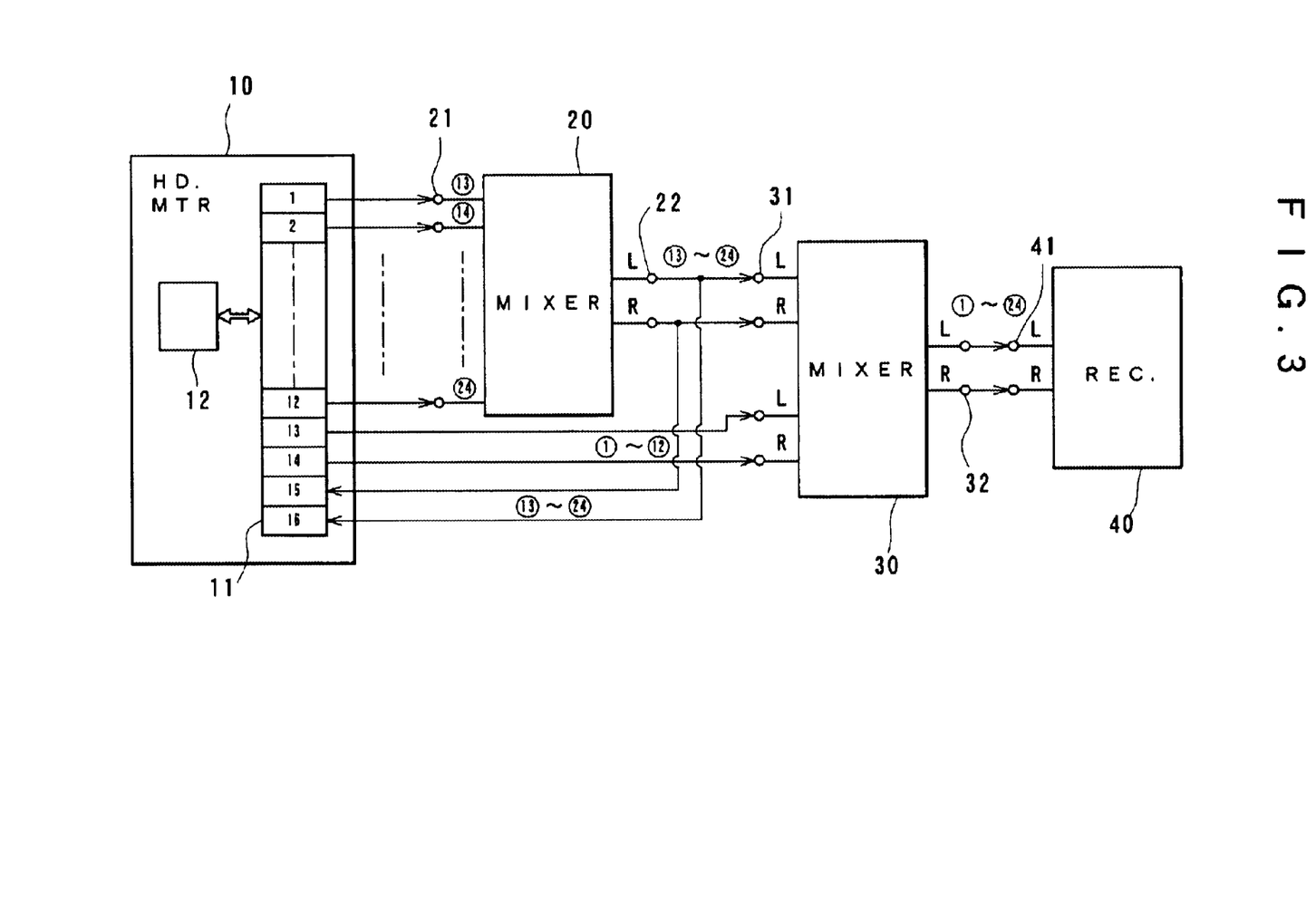
FIG. 3 also represents the connections that are established when Step 5 is performed.

As shown in FIG. 3, the reproduced sounds (for the parts 13–24) from the tracks 1–12 may be fed to the input lines 21 of the first mixer means 20, the stereophonic output lines 22 of which may be coupled to the tracks 15 and 16 of the multi-track recorder means 10 so that the reproduced sounds can be recorded. The reproduced sounds that appear at the stereophonic output lines 22 of the first mixer means 20, as well as the reproduced sounds from the tracks 13 and 14, may be fed to the stereophonic input lines 31 of the second mixer means 30 so that the mixdown can occur for those reproduced sounds. The stereophonic output lines 32 of the second mixer means 30 may be coupled to the stereophonic input lines 41 of the master recorder means 40 so that the reproduced sounds can be recorded.

(Step 6)

The parts 1–12 for which the mixdown has completed and that have been recorded on the tracks 13 and 14 at the multi-track recorder means 10, and the parts 13–24 that have been recorded on the tracks 1–12 may be reproduced at the same time, and the reproduced sounds may be mixed into a 2-channel stereophonic at the second mixer means 30, which is fed to the master recorder means 40 where the mixdown occurs. For now, the musical work may be finished. At this time, the sounds for the parts 13–24 for which the mixdown has completed may be recorded on the tracks 15 and 16.

(Step 7)

The sounds may be reproduced at the master recorder means 40, and the musical work may be checked by listening to the reproduced sounds. If it is found that the parts 13–14 have the mixing balance problem, go back to Step 6 where the mixdown may be retried. If it is found that the parts 1–12 have the mixing balance problem, proceed to Step 8.

(Step 8)

Figure 6:
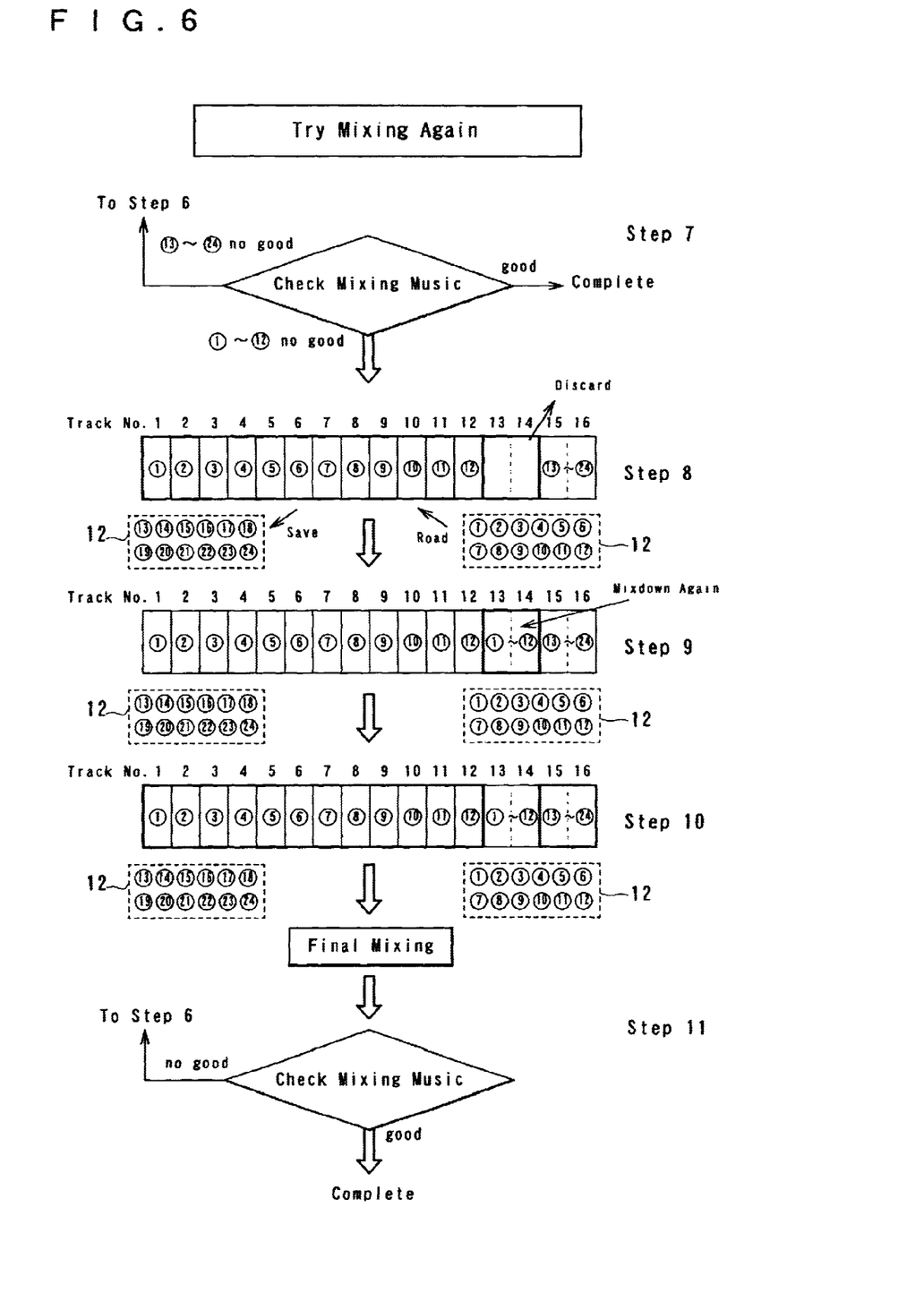
FIG. 6 is also a flowchart of the procedure implemented by the ping-pong recording method in accordance with one embodiment of the present invention.

The file containing the musical signals for which the parts 13–24 have been recorded on the tracks 1–12 may be saved in the saving area 12, while the file containing the musical signals for which the parts 1–12 was saved at Step 3 may be loaded onto the tracks 1–12. The musical signal file that resides on the tracks 13 and 14 may be discarded so that the tracks 13 and 14 can be reused for recording any other musical signals.

(Step 9)

Figure 4:
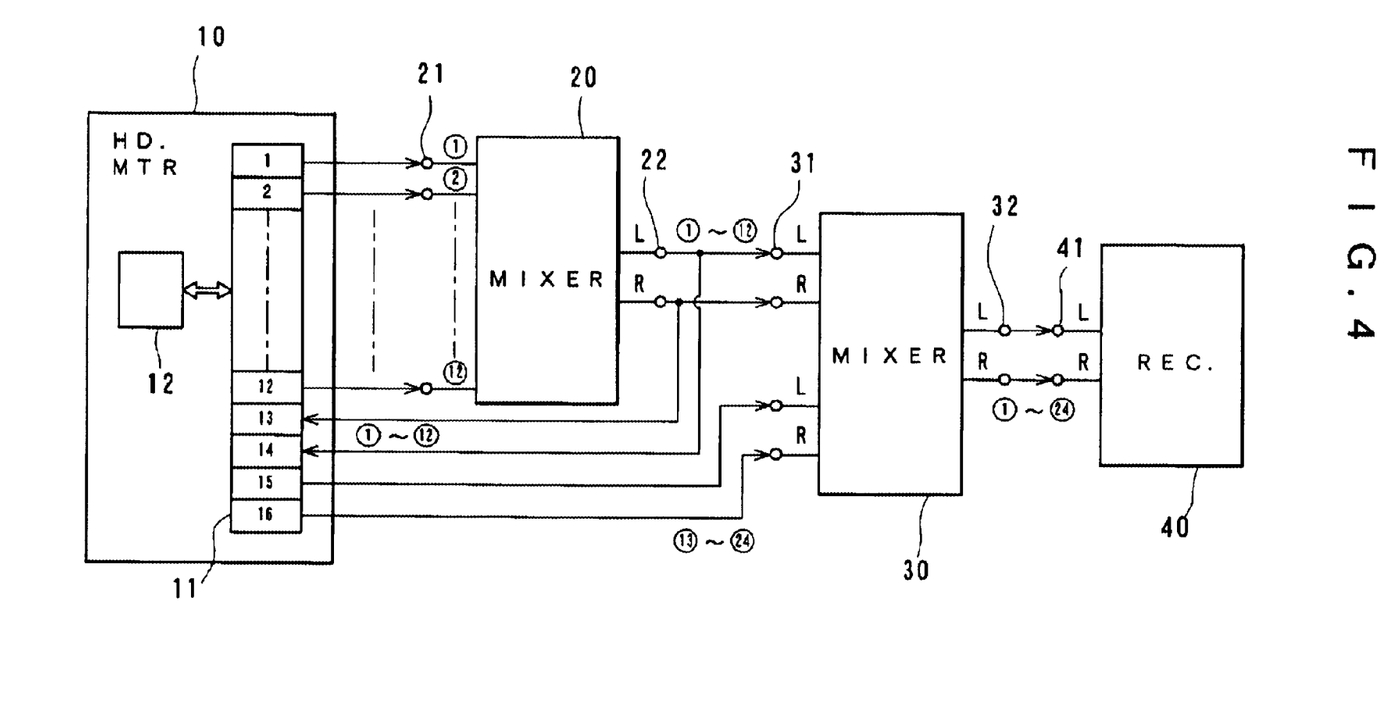
FIG. 4 also represents the connections that are established when Step 9 is performed.

As shown in FIG. 4, the reproduced sounds on the tracks 1–12 may be fed to the first mixer means 20, the stereophonic output 22 of which may be coupled to the tracks 13 and 14 so that the reproduced sounds can be recorded on the tracks 13 and 14. In parallel with this operation, the reproduced sounds that appear on the stereophonic output 22 of the first mixer means 20, and the reproduced sounds on the tracks 15 and 16 may be fed to the stereophonic input lines 31 of the second mixer means 30, respectively, and the stereophonic output lines 32 of the second mixer means 30 may be coupled to the stereophonic input lines 41 of the master recorder means 40 so that those reproduced sounds may be recorded. At this time, the sounds for the parts 1–12 for which the mixdown has completed may be recorded on the tracks 13 and 14.

(Step 10)

The tracks 1–12 on which the parts 1–12 have been recorded, and the tracks 15 and 16 on which the parts 13–14 have been mixed and recorded may be reproduced at the same time. The mixdown may be retried for the parts 1–12, which may then be recorded on the tracks 13 and 14. The sounds on the tracks 1–12 for which the mixdown has completed, and the sounds on the tracks 15 and 16 for which the mixdown has completed may be fed to the master recorder means 40 where those sounds are recorded.

(Step 11)

The musical signals that have been recorded at the master recorder means 40 may be reproduced, and the musical work may be checked by listening to the reproduced sounds. If it is found that there is no problem, the musical work may have been finished.

By operating the 16-track multi-track recorder according to the steps described above, the sounds for the 24 parts may be recorded, and then the mixdown may be retried by listening to the sounds for all the parts, and may be repeated until quality of all the sounds can be satisfactory to listener. Finally, the musical work can be completed.

When the multi-track recorder means 10, the first mixer means 20 and the second mixer means 30 are provided as separate devices, the switching operations for the connections between those devices will become more complex, whereas when those devices are integrated into a single unit, the connections can be switched automatically under control of the software within the controller 2. Controlling the connections in this way eliminates the above problem, and the 16-track multi-track recorder can be operated as if it were the 24-track multi-track recorder.

In this example, the track allocation is such that the tracks 1–12 are reserved for recording the individual parts, and the tracks 13, 14 and the tracks 15, 16 are reserved for the ping-pong recording, respectively. Thus, 12×2=24 parts may be recorded. Alternatively, the tracks 1–10 may be reserved for recording the individual parts, and the tracks 11, 12, the tracks 13, 14 and the tracks 15, 16 may be reserved for the ping-pong recording, respectively. In this way, 10×3=30 parts may be recorded.

More specifically, given the number of tracks available on the multi-track recorder 10, M, the number of sets (pairs) of the stereophonic inputs available on the second mixer means 30, S, and the number of mixdown channels available, C, then the number of tracks that can be extended may be expressed as $(M-C*S)*S$. In the example of this embodiment, the mixdown occurs on the 2-channel stereophonic music. For the 5-channel surround stereophonic music, for example, the number of the mixdown channels may be increased as required.

For the 16-track multi-track recorder on which the 2-channel mixdown stereophonic channels are available, for example, it may be appreciated from the above expression that the number of tracks that is available for recording will be equal to (16−2×2)×2=24 when S=2, and will be equal to (16−3×2)×3=30 when S=3.

As described in Step 3 and shown in FIG. 2, the musical signal file for which the parts 1–12 have been recorded on the tracks 1–12 may first be saved in the saving area 12, and then the tracks 1–12 may be reset to blanks. Alternatively, the multi-track recorder means 10 may be configured to allow the musical signal file for the parts 1–12 to be moved to the saving area 12, instead of being copied there.

In this case, the saving area 12 resides on the same storage medium allocated by the file system (not shown) on the hard disk within the multi-track recorder means 10, and each musical signal file for each track should have a unique file name.

As described in Step 3 and shown in FIG. 2, the multi-track recorder means 10 is configured such that the musical signal file for which the parts 1–12 have been recorded on the tracks 1–12 may first be saved in the saving area 12, and then the tracks 1–12 may be reset to blanks. In this case, the saving area 12 has not to reside on the same physical storage medium, but rather may reside on a different storage medium that may be connected to the multi-track recorder means 10 through a network.

(Embodiment 2)

In the embodiment 1, the groups of musical parts that are saved in the saving area are identical to those that are read from the saving area. In the following description, the process of altering the combination of musical parts using the apparatus of the present invention will be discussed. In this embodiment, the information concerning the audio effects, such as fading and echoing, that may be obtained by editing the musical parts during the mixing process may be saved in the saving area together with the associated musical signals. It is noted that Steps 1 through 6 in the preceding embodiment are the same as for the current embodiment. In the following description, therefore, only the subsequent steps (starting with Step 20) are described specifically.

(Step 20)

At Step 20, it is assumed that if some musical parts have the balance problem, those musical parts may be read from the saving area after their combination is changed, and then may be recorded on the tracks 1–12. In this case, the remaining musical parts that have no balance problem should preferably be read first. At the same time, the audio effect information associated with each musical part may be read so that it can be reproduced. For example, the musical parts 1–16 and 13–18 may be invoked.

(Step 21)

The above musical parts may be reproduced while their respective audio effect information is reproduced, and may be mixed down. The result may be recorded on the tracks 13 and 14. To this end, the musical signals that have previously been recorded on the tracks 13 and 14 may have been erased.

(Step 22)

The musical signals that reside on the tracks 1–12 may be erased, and the remaining musical parts, e.g., parts 7–12 and parts 19–24, may be read from the saving area 12, and then may be recorded on the tracks 1–12. As described above in Step 20, the audio effect information associated with each musical part may then be read so that it can be reproduced. (Step 23)

The musical signals on the tracks 1–12 may be reproduced while the audio effect information is reproduced. At the same time, the mixdown musical signals that have been recorded on the tracks 13 and 14 at Step 21may also be reproduced, for which the final mixing may occur together with the above musical signals.

Although this embodiment does not allow the mixdown process to occur while monitoring all of the musical parts, it has the advantage in that it allows the combination of musical parts to be changed during the mixdown process that may be retried. As the mixdown process can be retried while the associated audio effect information is reproduced, it can proceed with efficiency. It should be understood that the reproduction of the audio effect information is not limited to the embodiment where the combination of musical parts can be changed, but may also apply to the preceding embodiment.

It may be appreciated from the foregoing description that the present invention allows the ping-pong recording mixdown process to occur while monitoring all of the musical parts at the time when the mixdown process is retried, thus preventing any mixing errors. The present invention allows for use of less costly audio equipment to produce more sophisticated musical works.

The present invention supports the single-unit configuration of the multi-track recorder apparatus that incorporates the multi-track recorder means, the first mixer means and the second mixer means. In addition, the present invention may also support the configuration in which the above means are provided as separate devices, wherein any communications protocol, such as MIDI (Musical Instrument Digital Interface), may be employed to enable their respective processors to communicate with each other, switching the signal paths between the multi-track recorder means and the first and second mixer means so that files can be exchanged between them. This may provide the equivalent functions of the single-unit configuration.

What is claimed is:

1. A ping-pong recording method for use with a multi-track recorder apparatus that includes a randomly accessible storage medium, comprising the steps of:
   (a) dividing multiple tracks on the randomly accessible storage medium on the multi-track recorder into:
      (i) musical part recording tracks and
      (ii) at least two or more groups of mixdown recording tracks;
   (b) recording a group of musical signals on each of said musical part recording tracks, and storing said group of musical signals in a saving area on said storage medium so that they can be reproduced at a later time;
   (c) reproducing said musical part recording tracks on which the group of the musical signals have been recorded in the step (b), and recording the musical signals for which the mixdown have occurred on one of said at least two or more groups of mixdown recording tracks;
   (d) for each group of musical signals that are different from the preceding group of musical signals already recorded on the appropriate musical part recording tracks, repeating the steps (b) and (c); and
   (e) reading the groups of musical signals from said saving area as required, and loading said groups of musical signals onto said musical part recording tracks so that they can be reproduced at a later time.

2. The ping-pong recording method as defined in claim 1, wherein the groups of musical signals that are read from said saving area, and are loaded onto said musical part recording tracks so that they can be reproduced at a later time includes any musical signals optionally selected from two or more groups of musical signals stored in said saving area.

3. The ping-pong recording method as defined in claim 1, wherein said saving area is allocated on said randomly accessible storage medium for storing:
   (i) said musical signals corresponding to one of said musical part recording tracks and
   (ii) the track editing information associated with said one of said musical part recording tracks, and wherein said musical signals . . . and said track editing information may be read from said saving area as required.

4. The ping-pong recording method as defined in claim 2, wherein said saving area is allocated on said randomly accessible storage medium for storing:
   (i) said musical signals corresponding to one of said musical part recording tracks and
   (ii) the track editing information associated with said one of said musical part recording tracks, and wherein both said musical signals and said track editing information may be read from said saving area as required.

5. A multi-track recorder apparatus comprising:
   (a) a multi-track recorder means, said multi-track recorder means including a randomly accessible storage medium on which multiple tracks are allocated so that the recording and reproducing can occur on said multiple tracks, wherein the existing data already recorded on each of said multiple tracks may be replaced by any other data;
   (b) a first mixer means coupled to said multi-track recorder means and operative to mix the reproduced signals recorded on said multiple tracks on said multi-track recorder means; and
   (c) a second mixer means coupled to said multi-track recorder means and to said first mixer means and operative to mix the output signals from said multi-track recorder means that represent the rest of the reproduced signals that is not delivered to the input of said first mixer means from said multi-track recorder means, together with the output signals from said first mixer means.

6. The multi-track recorder apparatus as defined in claim 5, wherein the output signals from said first mixer means can be entered into said track regions.

7. The multi-track recorder apparatus as defined in claim 5, wherein
   the input of said first mixer means is coupled to those of said tracks that are reserved as the musical part recording tracks; and
   one of the inputs of said second mixer means is coupled to those of said tracks reserved as two or more groups of mixdown recording tracks, each of said two or more groups consisting two or more tracks.

8. The multi-track recorder apparatus as defined in claim 6, wherein
   the input of said first mixer means is coupled to those of said tracks that are reserved as the musical part recording tracks; and
   one of the inputs of said second mixer means is coupled to those of said tracks reserved as two or more groups of mixdown recording tracks, each of said two or more groups consisting two or more tracks.

9. The multi-track recorder apparatus as defined in claim 5, further including a connection control means that enables said multi-track recorder means selectively to be switched to said first mixer means or to said second mixer means.

10. The multi-track recorder apparatus as defined in claim 6, further including a connection control means that enables said multi-track recorder means selectively to be switched to said first mixer means or to said second mixer means.

11. The multi-track recorder apparatus as defined in claim 7, further including a connection control means that enables said multi-track recorder means selectively to be switched to said first mixer means or to said second mixer means.

12. The multi-track recorder apparatus as defined in claim 8, further including a connection control means that enables said multi-track recorder means selectively to be switched to said first mixer means or to said second mixer means.

13. A multi-track recorder apparatus comprising:
(a) a multi-track recorder means, said multi-track recorder means including a randomly accessible storage medium on which multiple tracks are allocated so that the recording and reproducing can occur on said multiple tracks, wherein the existing data already recorded on each of said multiple tracks may be replaced by any other data;
(b) a first mixer means coupled to said multi-track recorder means and operative to mix the reproduced signals on said multiple tracks on said multi-track recorder means;
(c) a second mixer means coupled to said multi-track recorder means and to said first mixer means and operative to mix the output signals from said multi-track recorder means that represent the rest of the reproduced signals that is not delivered to the input of said first mixer means from said multi-track recorder means, together with the output signals from said first mixer means; and
(d) a control means that enables the data already recorded on each of said multiple tracks to be replaced by any other data, and controls the signal paths of the input and output signals exchanged between said multi-track recorder means, said first mixer means and said second mixer means.

* * * * *